July 31, 1962 L. W. HUSSEY 3,047,667

TRANSISTOR CROSSPOINT SWITCHING NETWORK

Filed Feb. 24, 1958 3 Sheets-Sheet 1

INVENTOR
L. W. HUSSEY
BY Alan C. Rose
ATTORNEY

July 31, 1962 L. W. HUSSEY 3,047,667

TRANSISTOR CROSSPOINT SWITCHING NETWORK

Filed Feb. 24, 1958 3 Sheets-Sheet 2

INVENTOR
L. W. HUSSEY
BY Alan C. Rose
ATTORNEY

PRIOR ART CIRCUIT

OPERATING CHARACTERISTIC OF PRIOR ART CIRCUIT

INVENTOR
L. W. HUSSEY

United States Patent Office 3,047,667
Patented July 31, 1962

3,047,667
TRANSISTOR CROSSPOINT SWITCHING NETWORK

Luther W. Hussey, Sparta, N.J., assignor to Bell Telephone Laboratories, Incorporated, New York, N.Y., a corporation of New York Filed Feb. 24, 1958, Ser. No. 717,216
11 Claims. (Cl. 179—18)

This invention relates to circuit controlling devices and more particularly to networks employing such devices to establish connections between separate network points. This application is a continuation in part of my copending application Serial No. 400,496, filed December 28, 1953, now Patent 2,876,366, issued March 3, 1959.

In the operation of a variety of circuits and systems, it is necessary that a connecting link or a portion of the circuit or system be transferred from a high impedance-low current state to a low impedance-high current state in response to a prescribed condition. For example, in a telephone switching system it is desirable that circuits be closed at so-called crosspoints between trunks or lines in response to marker pulses of prescribed amplitude.

There have been proposed heretofore various configurations of semiconductor devices to compose circuitry which may be utilized in telephone switching networks having one or more crosspoint circuits in a network path. In the application of which this is a continuation in part, for example, one particular semiconductor switch employing transistor and breakdown diode devices has been disclosed. Among other uses, this switch may be employed as a crosspoint in such a telephone switching network. My present invention employs certain of the semiconductor devices arranged as crosspoint switches interconnected in a fashion to provide control of conduction within a switch or a group of switches in the manner taught broadly in the parent application. The resulting crosspoint circuits are controlled by each other in accordance with my present invention to provide an exemplary telephone switching network suitable for use in an electronic switching system.

In certain two-terminal transistor crosspoint configurations having a characteristic of high impedance below some breakdown voltage and low impedance, with a resultant increase in current therethrough, above this breakdown voltage, one of the inherent problems has been that of sufficiently controlling the current multiplication factor, commonly designated "alpha," in the design production of the transistor. For example, if the alpha is too small the collector impedance remains high and there may be no voltage peak in the reverse collector characteristic. Conversely, if this factor is too large, the peak decreases and for large values there may be no peak at all; i.e., the reverse collector impedance may be small for substantially all values of reverse voltage. Because various transistor units, as manufactured, may vary considerably in the value of alpha, despite attempts to manufacture such units with substantial uniformity, the utilization of transistors in a telephone switching network commonly entails considerable circuit design effort and the provision of comparatively wide margins in the operating votages selected to control the network.

A further difficulty in the use of transistor crosspoint switches in a switching network arises when the transistor crosspoint in the open circuit condition has zero voltage across its terminals. The relatively low impedance which then obtains across these terminals, due to the fact that the transistor crosspoint is operating at the low voltage portion of its voltage-current characteristic curve, may result in unwanted transmission, or crosstalk, within the switching network. Therefore, it is desirable that the selected switches in the conducting condition have not only a very low alternating current impedance for efficiency in switching but in addition have a steady direct current voltage drop. Under these circumstances, all deenergized crosspoint switches connected between two or more conducting switches are properly biased away from the zero voltage region, and crosstalk is avoided.

One general object of this invention is to improve switching networks employing transistors in crosspoint circuits.

A more specific object of this invention is to economize on components and simplify the circuitry in a switching network of semiconductor crosspoints.

Another specific object of this invention is to reduce the excursion in the operating voltages required for control of the semiconductor crosspoints of a switching network.

A further specific object of this invention is to reduce the dependence on the variations of the parameters of the transistors utilized in a switching network, thereby increasing the reliability of network operation.

Another general object of this invention is to eliminate the problem in a switching network using transistor crosspoints which arises from the characteristic low impedance of transistors operating near zero current and voltage. In particular, it is an object of this invention to prevent crosstalk in such a switching network.

More specifically, it is an object of this invention to combine in a transistorized switching network the characteristic of low alternating current impedance with a controlled direct current voltage drop during conduction.

In one illustrative embodiment of my invention, a number of transistor crosspoint circuits, each comprising a transistor having an alpha greater than one and a pair of semiconductor breakdown diodes, also known in the art as Zener diodes, to control the point at which switching of the crosspoint circuit occurs, are arranged to provide an exemplary switching network. In response to proper marking signals, this embodiment of my invention provides a low impedance connection between any selected pair of terminals at opposite ends of the network.

Furthermore, in accordance with another aspect of my invention, there can be provided, at a considerable saving of circuit components, a judicious combination of transistor crosspoint circuits in a desired switching network which utilizes a single breakdown diode for a group of transistor crosspoint circuits, rather than one such diode for each circuit. This aspect is provided by another specific embodiment of my invention in which a number of transistor crosspoint configurations are arranged in switching groups, or stages. Each group of transistor circuits has in series with it a breakdown diode, known to the art, poled reversely to the normal direction of current through its associated transistor circuits. Successive switching groups of these transistor crosspoint circuits may be arranged as desired to provide for conducting paths through the network between respective terminals at opposite ends of the network.

Each breakdown diode provides for its associated transistor circuitry a more precise control of the potential at which the circuit switches to its conducting condition as well as providing a voltage drop across a conducting switch to prevent unwanted transmission between paths within the network. The improved control of the breakdown potential results from the fact that it is inherently more difficult to establish this level in the manufacture of transistors than in the manufacture of breakdown diodes. Furthermore, by utilizing a breakdown diode with a group of transistor crosspoint circuits the voltage drop across the diode when one of the associated circuits is conducting furnishes a reverse bias to the other associated circuits in the group to bias them out of their low impedance region in the neighborhood of zero current and voltage.

It is, therefore, a general feature of this invention that a switching network utilize transistor crosspoint circuits having breakdown devices therein which control the breakdown potential of the crosspoint circuits.

It is a further feature of this invention that a transistor crosspoint switching network utilize breakdown devices with transistor crosspoint circuits to control the establishment and maintenance of conducting paths through the network.

More specifically, it is a feature of this invention that a group of transistor crosspoint circuits be arranged with a single breakdown diode in a switching network to prevent crosstalk between busy paths within the network.

A further feature of this invention is the provision of a group of transistor crosspoint switches arranged with a single breakdown diode to control the breakdown of a single crosspoint in the group and the impedance of the remaining crosspoints within the group.

A still further feature of this invention is the provision in a switching network utilizing transistor crosspoint switching circuits of a breakdown device common to a group of these circuits to provide a controlled direct current voltage drop across the breakdown device and its associated group during conduction.

A complete understanding of this invention and of these and various other features thereof may be gained from the following detailed description with reference to the accompanying drawing, in which.

Figure 1:
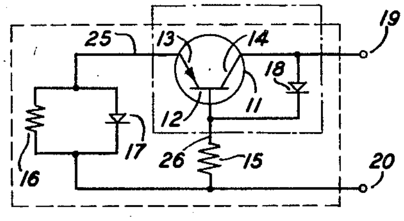
FIG. 1 depicts a transistor crosspoint circuit in accordance with my invention disclosed in the above cited application of which this is a continuation in part.

Referring now to the drawing, FIG. 1 shows a transistor 11 having a base 12 with which an emitter electrode 13 and a collector electrode 14 make rectifier contact. The transistor may be of the type disclosed in J. Bardeen et al. Patent 2,524,035, issued October 3, 1950, but other designs, such as those disclosed in W. Shockley Patent No. 2,509,347, granted September 25, 1951, can be used with the present invention.

The emitter electrode 13 is connected to a parallel circuit comprising a Zener diode 17, such as is disclosed in W. Shockley Patent 2,714,702 issued August 2, 1955, and a resistor 16.

A feedback promoting resistor 15 is provided common to the emitter-base and collector-base circuits as shown. Connected directly between the collector electrode and the base is a second Zener diode 18. Terminals 19 and 20 are connected to the collector and to the base respectively, the former directly and the latter through the feedback promoting resistor 15.

In the operation of the transistor switching circuit, the collector 14 has a voltage applied thereto from terminals 19 and 20 which is in the reverse direction relative to the base 12, thereby causing a reverse current to flow in the collector circuit. The emitter 13 has a voltage applied thereto in the forward direction by virtue of the voltage produced across the feedback resistor 15 due to the flow of the reverse collector current.

Figure 5:
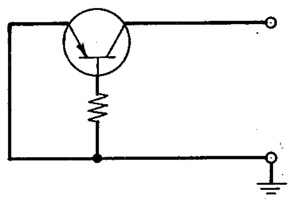
FIG. 5 is a schematic representation of a prior art circuit of the type to which this invention pertains.
Figure 6:
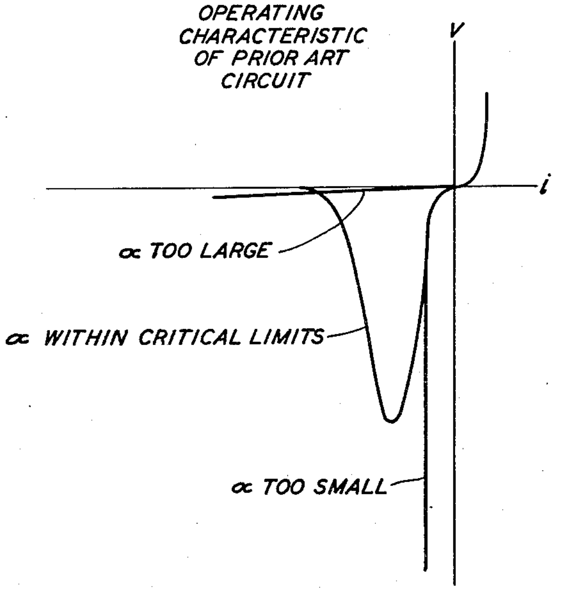
FIG. 6 is a graph representing the operating characteristics of the prior art circuit of FIG. 5.

With Zener diode 17 shorted and Zener diode 18 omitted, FIG. 1 would depict a switching circuit of a type known in the art. This circuit is shown in FIG. 5. Such a circuit is regenerative by virtue of a negative resistance characteristic due to feedback from the collector to the emitter. For voltages between zero and the peak value at which the transistor triggers, applied to the base-collector circuit, the impedance between terminals 19 and 20 is high and the switch is considered open. When a voltage at least equal to the peak value is applied, the switch transfers to the low impedance or closed condition. Thus, due to its bistable characteristics, it is manifest that this particular circuit has many possible switching applications, as in the telephone and related fields. However, there are several limitations on the control of such switching operations, as related hereinabove, which pertain to the difficulty of reliably controlling the switching voltage of the prior art crosspoint circuit through dependence on the transistor alpha alone. For example, in FIG. 3 the curve identified by the legend "Circuit without 17, 18 16=0" exhibits no voltage peak, resulting from a transistor having too large a value of alpha, as previously described. The operating characteristics of the prior art circuit of FIG. 5 are shown in FIG. 6 wherein the curve marked "α too large" corresponds to the curve of FIG. 3 labeled "Circuit without 17, 18 16=0." The other curves of FIG. 6 further depict the effect of transistor alpha on prior art circuit operation. The curves depict the desired operating characteristic which obtains when alpha is within certain critical limits and the third curve shows the characteristic of such a circuit when alpha is below the critical minimum. These difficulties have been resolved by placing Zener diodes in the emitter and collector circuits as more fully explained below.

Figure 3:
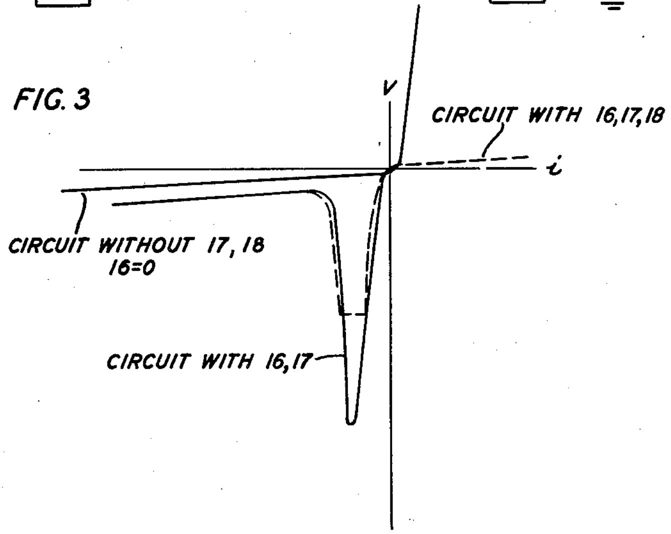
FIG. 3 is a graph representing the characteristics of devices of the type shown in FIG. 1.

The addition of Zener diode 18 between the collector and the base, connected so that the base and the electrode of the Zener diode connected thereto are of similar conductivity type semiconductor material, permits a more precise control of the voltage peak as shown in FIG. 3. The manner of controlling the voltage peak is more fully discussed in L. B. Valdes Patent 2,655,608, issued October 13, 1953. Briefly, this is accomplished by using a Zener diode which has a preassigned Zener voltage below the normal peak voltage of the circuit. When the collector voltage is small and the impedance high, the collector current is negligible and the current through the feedback resistor is similarly small so that the emitter voltage is substantially zero. When the diode voltage reaches the value of the Zener voltage, the diode breaks down, in effect, the feedback current becomes large, and the emitter is biased in the forward direction to trigger the transistor to the high current-low impedance state. The collector Zener diode thus operates as a control element in the transistor switching circuit to enable a more accurate determination of the peak voltage at which the transistor switches states.

The inclusion of a breakdown diode in the emitter lead of a transistor crosspoint circuit, either alone or with the device disclosed in the Valdes patent cited above, provides a transistor switch with a low alternating current impedance and a substantially fixed direct current voltage when in the closed position, in addition to providing increased control over the transfer voltage point. As shown in FIG. 1, Zener diode 17 and resistor 16 are connected in parallel relationship in the emitter-base circuit. For low values of voltage between the terminals 19 and 20, as is evident from the characteristic curves in FIG. 3, the current through resistor 15 is small and the transistor 11 is in the high impedance or open circuit state. When the applied voltage reaches the Zener point of the diode 17, the current through resistor 15 increases abruptly due to the low impedance resulting from the so-called breakdown of the diode 17. The resultant increase in feedback current through resistor 15 causes an increase in the forward bias on the emitter 11, and triggers the transistor to the high current or closed condition. The conduction of the emitter Zener diode has in effect clamped the voltage across the switch terminals to the Zener voltage magnitude to produce in the operate condition the desired low alternating current impedance and the controlled direct current voltage.

Switching circuits without an emitter Zener diode such as that disclosed in the above-cited Valdes patent, return after the voltage peak to zero or very low voltage. Furthermore it will be noted that even for a transistor circuit employing a Zener diode in series with its emitter the slope of the voltage-current characteristic curve is less for values of voltage near zero than for larger values of voltage, signifying a smaller resistance for the crosspoint circuit at zero voltage condition than when some bias voltage exists across the switch. Prior art transistor crosspoint switches have been unsatisfactory for use in switching networks because of their tendency to conduct in the low-current condition, permitting unwanted transmission, or crosstalk, between established paths.

Figure 2:
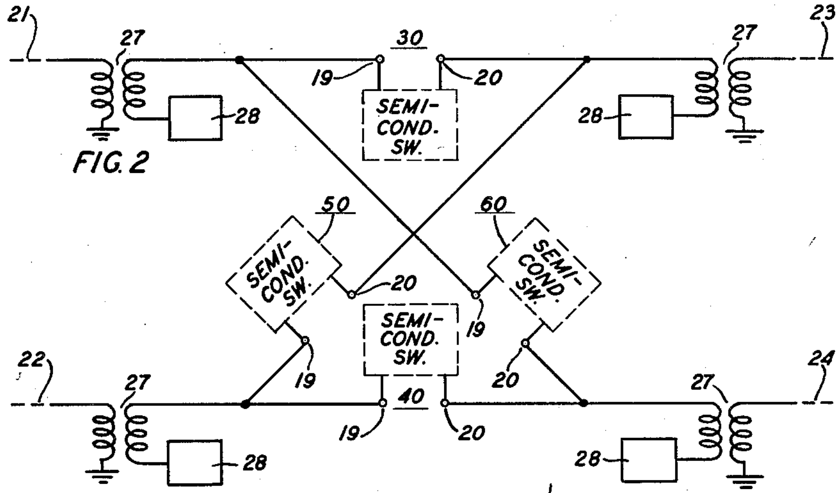
FIG. 2 depicts one specific embodiment of a telephone switching network in accordance with the present invention.

The switching network of FIG. 2, depicting one specific embodiment of my invention, illustrates the advantageous results of utilizing crosspoint switches such as are shown in FIG. 1. In FIG. 2 such semiconductor switches are connected between the terminals of lines 21 to 24 through associated transformers 27. Connected to one winding of each transformer 27 is a corresponding control circuit 28. In the arrangement shown, either of the lines 21 or 22 may be selectively connected to either of the lines 23 or 24 by the operation of the proper one of switches 30, 40, 50 and 60 under the influence of the appropriate control circuits 28. If, for example, line 21 is to be connected to line 23, and line 22 is to be connected to line 24, marker pulses of prescribed amplitude placed on said lines will operate crosspoint switches 30 and 40 respectively, in the manner discussed hereinabove. If, as with prior art transistor switches, there were no potential drop across the operated switches 30 and 40, the potentials on the terminals of each of the interconnecting switches 50 and 60 would be equal, causing the later switches to be in the low resistance zero voltage region. The possibility of undesired line connections in this state has been eliminated by the instant invention which provides a controlled direct current voltage, namely, the Zener diode voltage, at the terminals of the closed switches to bias the associated unselected switches to a higher impedance region. One of the advantages of the instant invention is that this serious problem has been solved, while maintaining a low alternating current impedance for efficient switching operations, thus permitting the use of such crosspoint circuits in a satisfactory telephone switching network.

Figure 4:
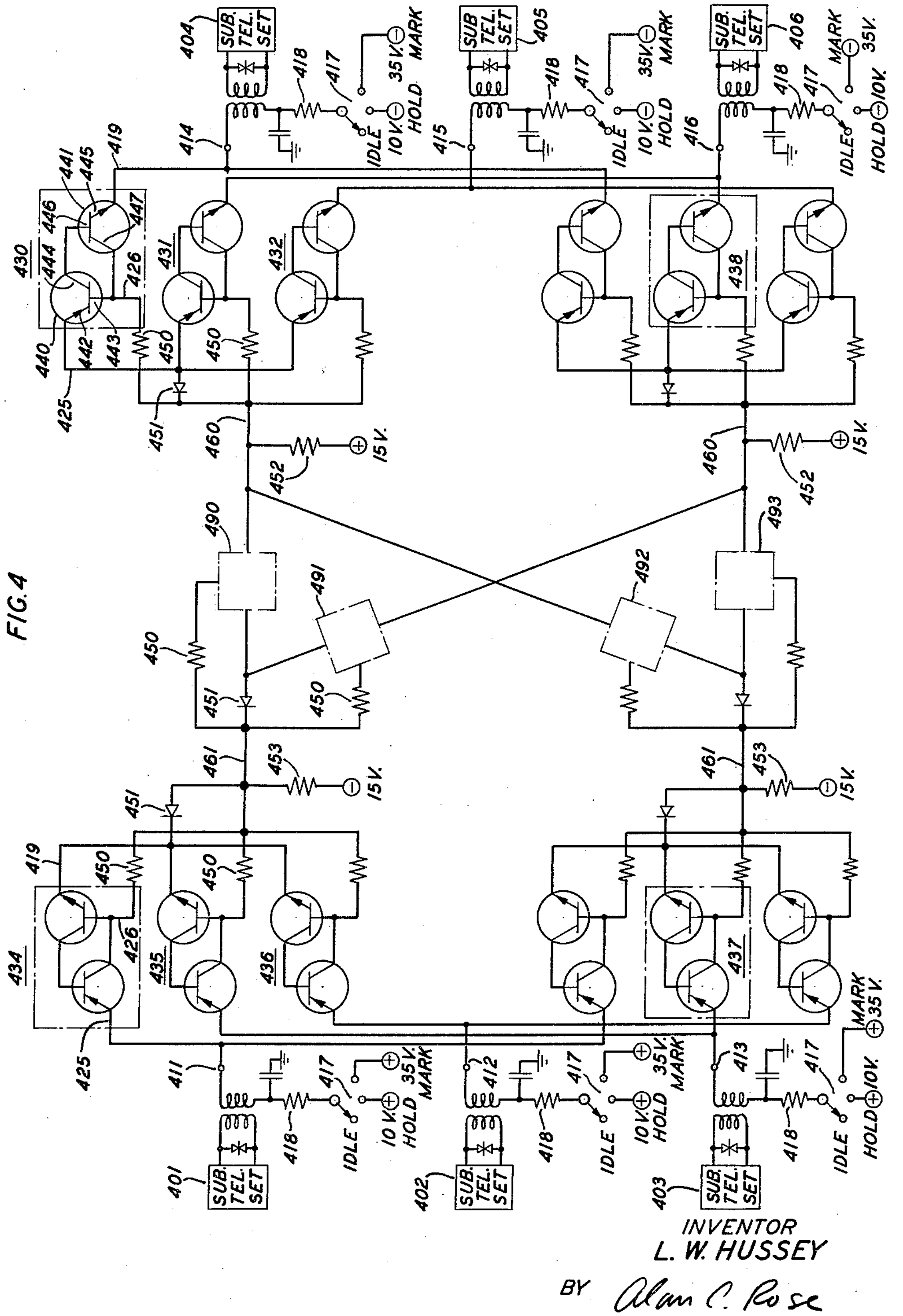
FIG. 4 is a second specific embodiment of a telephone switching network in accordance with my invention.

FIG. 4 depicts another specific embodiment of my invention and illustrates the use of other transistor crosspoint circuits such as are disclosed in W. Shockley Patent No. 2,655,609, issued October 13, 1953, in a somewhat more complex switching network, Alternatively the switching network, in accordance with my invention, may employ as crosspoints the device disclosed in J. J. Ehers Patent No. 2,655,610, issued October 13, 1953. In FIG. 4, subscriber telephone sets 401 through 406 are shown coupled through appropriate circuitry to respective network terminals 411 through 416. Within the switching network proper is shown a plurality of crosspoint switching circuits, each comprising a pair of opposite conductivity type transistors arranged in conjugate connectoin to provide a composite alpha greater than unity as is known in the art. Such a circuit 430 is shown comprising transistor 440 having an emitter 442, a base 443 and a collector 444 and transistor 441 having an emitter 445, a base 446 and a collector 447. Each pair of transistors is interconnected, base 446 being connected to collector 444 while base 443 is connected to collector 447. Circuit 430 is shown within a dot-dash outline from which extend leads 425, 426 and 419 which comprise the effective emitter, base and collector leads, respectively, of the conjugate pair.

The transistor crosspoint circuits are arranged in switching groups; for example, circuits 430, 431 and 432 comprise one group, circuits 434, 435 and 436 another, et cetera. Associated with each switching group is a breakdown diode 451 poled reversely to the normal direction of current through its associated crosspoint circuits. Each composite base lead 426 has connected to it a feedback resistor 450. The feedback resistors 450 of each switching group are in common connection with one electrode of the associated breakdown diode 451. The opposite electrode of breakdown diode 451 is connected to a second junction common to each switching group, which for those circuits appearing on the right-hand side of the drawing joins the emitters of the conjugate circuits in each group.

The opposite end of each transistor circuit 430, 431 and 432 is connected to a network terminal 414, 415 and 416, respectively. Other transistor crosspoint circuits in a second switching group depicted in the lower right corner of FIG. 4 are similarly connected to network terminals 414, 415 and 416 to provide duplicate access to these terminals. Similarly disposed transistor crosspoint circuits are shown in the left-hand side of the figure and provide access to network terminals 411, 412 and 413.

Between these terminal connected switching groups are arranged transistor crosspoint circuits 490, 491, 492 and 493 comprising secondary switching groups interconnecting the terminal switching groups. These secondary stages are arranged to provide interconnections horizontally or diagonally between right and left-hand switching groups. They may comprise conjugate transistor crosspoint arrangements such as appear in the dot-dash outline about transistor pair 430, the single transistor circuit within the dot-dash outline of FIG. 1 or other transistor crosspoint circuits as are known in the art. Each has associated with it a feedback resistor 450 and each pair of secondary stage crosspoints has a breakdown diode 451 connected as previously described. Interstage connecting leads 460 and 461 are connected through resistors 452 and 453 to sources of bias voltage, resistor 452 being connected to a positive 15 volt source while resistor 453 is connected to a negative 15 volt source of potential.

Transistor crosspoint circuits 434, 435 and 436 are arranged in a switching group similar to the group comprising transistor crosspoint circuits 430, 431 and 432 except that the group's associated breakdown diode 451 and its individual crosspoint circuit feedback resistors 450 are disposed at the opposite end of the switching group. A second complete switching group arrangement is depicted in the lower half of FIG. 4 corresponding to the switching group arrangement depicted in the upper half of the figure and described above.

Each network terminal 411 through 416 is connected through a resistor 418 to its individually associated switch 417. Each switch has three positions for the purpose of applying a marking voltage, a holding voltage or no potential to its associated network terminal. The marking potentials so applied in this specific embodiment are positive 35 volts for the left-hand terminals and negative 35 volts for the right-hand terminals. Similarly, the holding voltages are positive 10 volts for the left-hand terminals and negative 10 volts for the right-hand terminals. Resistors 452 and 453 are 500,000 ohms each.

The crosspoint circuits used in this specific embodiment of the invention are arranged to break down upon the application of 50 volts through a resistance of 500,000 ohms and remain broken down for holding voltages in excess of 5 volts and currents in excess of 50 microamperes.

To describe the establishment of a path through the depicted switching network, let us assume that subscriber telephone set 401 is to be connected to subscriber telephone set 404. Switches 417 associated with network terminals 411 and 414 are placed in the Mark position. One transistor crosspoint circuit in each of the four network terminal switching groups thereby has 50 volts applied across it through a resistance of 500,000 ohms. All of these marked crosspoint circuits thereupon break down, passing the mark to the circuits 490, 491, 492 and 493 in the secondary switching stage. Upon breakdown of the terminal crosspoint circuits, the potentials of leads 460 and 461 shift because of the large values of resistances 452 and 453. The secondary circuits 490, 491, 492 and 493 thus have sufficient voltage across them to break down one of these circuits. Upon such a breakdown the voltage across the secondary switching group drops to the holding potential of approximately 5 volts because of the additional current through resistors 418 associated with the network terminals.

Once a path is established through the network between terminals 411 and 414, associated switches 417 are switched from Mark to Hold positions. The resulting reduction in voltage across the terminal groups crosspoints drops the current through the now conducting but unused crosspoint circuits below the minimum sustain value so that these circuits switch back to the non-conducting state, leaving conducting only those crosspoint circuits actually included in a complete path through the network. The release of an established network path is accomplished by the switching of the associated switches 417 from their Hold to Idle positions. With not voltage applied to the circuit the conducting crosspoints switch to the non-conducting state.

Assume that the path between network terminals 411 and 414 remains established through terminal group transistor crosspoints 434 and 430 and the secondary group crosspoint 490. Also, consider that a conducting path has been established between terminals 413 and 416 through terminal group crosspoints 437 and 438 and the secondary group crosspoint 493. Without the voltage drop provided for each group by its associated breakdown diode 451, unwanted transmission between upper and lower conducting paths might be possible because of the low impedance of transistor crosspoint circuits under near-zero voltage conditions as described above. In the circuit of FIG. 4, however, each of the crosspoint circuits which could permit transmission between the upper and lower network paths has established across it the bias voltage which is developed across its associated breakdown diode 451.

Furthermore, in accordance with one aspect of this invention, the arrangement of the crosspoint circuits in switching groups permits the use of only one breakdown diode 451 for each switching group rather than one such breakdown diode for each crosspoint as has hitherto been necessary. This arrangement permits a considerable economy in the components arranged in such a telephone switching network without sacrificing any of the desirable advantages provided by the inclusion of a breakdown diode in a cross-point circuit.

The crosspoint network shown in FIG. 4 depicts only two parallel switching paths between two opposite groups of three telephone subscribers each. It is to be understood that the switching network in accordance with my invention is not to be limited to one of this size but my invention comprehends much larger switching networks. Such networks may, in accordance with my invention, have additional pluralities of switching groups in series-parallel combinations. Furthermore, these switching groups may consist of many more crosspoint circuits than are depicted in each group in the figure. It should be clear that the economies effected by my invention increase with the number of crosspoint circuits that are included in a particular switching group.

The particular values of circuit voltages and bias impedances employed in the specific embodiment of my invention were selected for the proper operation of the described network. Other voltages and impedances may be employed as is known in the art to provide other arrangements in accordance with my invention.

It is to be understood that the above described arrangements are illustrative of the principles of the invention. Numerous other arrangements may be devised by those skilled in the art without departing from the spirit and scope of the invention.

What is claimed is:

1. A crosspoint switching network comprising a plurality of input conductors, a plurality of output conductors, a plurality of individually operable transistor switching circuits connected between said input and output conductors for enabling any of said input conductors to be connected to any of said output conductors, means connected to said input and output conductors for determining the conditions of said transistor switching circuits, and means for preventing undesired connections between said conductors when selected ones of said transistor switches are in the operate condition, said last-mentioned means comprising semiconductor reverse voltage breakdown diodes having preassigned Zener voltages, each of said diodes being connected in series with the emitter electrodes of at least two of said transistor switches.

2. A crosspoint switching network in accordance with claim 1 wherein said semiconductor diodes are poled in the reverse direction for the normal collector bias polarity.

3. An electronic switching circuit comprising opposed pluralities of terminals, transistor crosspoint circuits connecting each terminal of one plurality with each terminal of the other plurality, said transistor crosspoint circuits having a low resistance portion of their current-voltage characteristic near the zero voltage region, means connected to each of said transistor crosspoint circuits to control the impedance states of the associated transistor crosspoint circuits, and means for preventing crosstalk between two separate parallel low impedance paths between two sets of opposed terminals, said preventing means including a plurality of breakdown diode means each connected in series with at least two of said crosspoint circuits to bias the de-energized crosspoint circuits interconnecting said parallel paths away from the zero voltage region.

4. An electronic switching circuit comprising opposed pluralities of terminals, transistor crosspoint circuits connecting each terminal of one plurality with each terminal of the other plurality, said transistor crosspoints having a low resistance portion of their current-voltage characteristic near the zero voltage region, means connected to each of said transistor crosspoint circuits to control the impedance states of the associated transistor crosspoint circuits, said control means including at least one breakdown diode poled reversely to the normal direction of current through said associated crosspoint circuits, and means for preventing crosstalk between two separate parallel low impedance paths between two sets of opposed terminals, said last-mentioned means including circuitry for applying the voltage developed across said breakdown diode to bias the de-energized crosspoints interconnecting said parallel paths away from the zero voltage region, said transistor crosspoint circuits being arranged in groups with one said breakdown diode in common series connection with those transistor crosspoint circuits of a particular group.

5. An electronic switching network comprising opposed pluralities of terminals, transistor crosspoint circuits connecting each terminal of one plurality with each terminal of the other plurality, said transistor crosspoints having a low resistance point in their characteristic near the zero voltage region and a low alternating current impedance in the conducting state, means connected to each of said transistor crosspoint circuits to control the impedance states of the associated crosspoint circuits, said control means including at least one breakdown diode poled reversely to the normal direction of current from said associated transistor crosspoint circuits, said control means also including additional breakdown diodes to provide uniformity of breakdown characteristics of said associated transistor crosspoint circuits, and means for preventing crosstalk between two separate parallel low impedance paths betwen two sets of opposed terminals, said last-mentioned means including circuitry for applying the voltage developed across said first-mentioned breakdown diode to bias the deenergized crosspoints interconnecting said parallel paths away from the zero voltage region.

6. A crosspoint switching network comprising a plurality of input conductors, a plurality of output conductors, a plurality of groups of individually operable transistor switching circuits connected between said input and said output conductors for enabling any of said input conductors to be conductively connected to any of said ouput conductors, and means common to a group of said switching circuits for preventing undesired connections between the input and output conductors, said means comprising a semiconductor reverse voltage breakdown diode having a preassigned breakdown voltage connected in series with the transistor switching circuits of a particular group and poled reversely to the normal current direction therethrough.

7. An electronic switching network having a plurality of terminals and comprising a plurality of transistor crosspoint circuits arranged in groups, each group comprising those transistor crosspoint circuits having a common connection within said network, means for establishing a conducting path through said groups connected in series between said terminals, and means for limiting said conducting path within any said group to only one transistor crosspoint circuit of said group at a time, said limiting means including a reverse voltage breakdown device common to the transistor crosspoint circuits of a particular group, connected in series therewith and poled reversely to the normal current direction therethrough.

8. An electronic switching network having a plurality of terminals and comprising a plurality of transistor crosspoint circuits arranged in groups, each group comprising those transistor crosspoint circuits having a common connection within said network, means for establishing a conducting path through said groups connected in series between said terminals, and means for preventing crosstalk between any pair of established conducting paths through said network, said preventing means including a two-terminal breakdown device common to a group of said transistor crosspoint circuits and connected to said common connection and further including a plurality of resistors each connected between an associated transistor circuit and said breakdown device opposite said common connection.

9. An electronic switching network as set forth in claim 8 wherein said two-terminal breakdown device is connected in series with its associated transistor crosspoint circuits along a path through said network.

10. An electronic switching network as set forth in claim 9 wherein said breakdown device comprises a breakdown diode poled reversely to the normal direction of current through said associated transistor crosspoint circuits.

11. A telephone switching network comprising opposed pluralities of terminals, transistor crosspoint circuits connecting each terminal of one plurality with each terminal of the other plurality, means for applying control potentials to said transistor crosspoint circuits for establishing communication paths between selected pairs of terminals, and means for establishing the peak breakdown voltage of said transistor crosspoint circuits within predetermined limits including a first reverse voltage breakdown diode connected between the collector and base of said transistor and a second reverse voltage breakdown diode in parallel with a resistance connected in series wtih the emitter of said transistor.

References Cited in the file of this patent

UNITED STATES PATENTS

| | | |
|---|---|---|
| 2,655,608 | Valdes | Oct. 13, 1953 |
| 2,655,609 | Shockley | Oct. 13, 1953 |
| 2,684,405 | Bruce et al. | July 20, 1954 |
| 2,831,983 | Ostendorf | Apr. 22, 1958 |
| 2,831,984 | Ebers et al. | Apr. 22, 1958 |
| 2,876,285 | Bjornson | Mar. 3, 1959 |